# United States Patent [19]

Kunze

[11] Patent Number: 4,916,823

[45] Date of Patent: Apr. 17, 1990

[54] APPARATUS FOR FACILITATING ROADWAY GRADE MEASUREMENTS

[76] Inventor: Edward L. Kunze, 17988 Lakeshore Dr., Lake Elsinore, Calif. 92330

[21] Appl. No.: 302,548

[22] Filed: Jan. 26, 1989

[51] Int. Cl.⁴ .............................................. G01B 5/28
[52] U.S. Cl. ........................................ 33/521; 33/413
[58] Field of Search ................. 33/413, 761, 756, 755, 33/1 H, 1 LE, 407, 408, 409, 521, 533

[56]  References Cited

U.S. PATENT DOCUMENTS

| 433,697 | 8/1890 | Reichenback . | |
| 492,636 | 2/1893 | Snyder | 33/409 |
| 1,094,286 | 4/1914 | Winstead | 33/409 |
| 1,660,369 | 2/1928 | Basich | 33/521 |
| 1,912,546 | 7/1933 | Smith | 33/521 |
| 2,231,432 | 2/1941 | Wilczek | 33/521 |
| 2,523,255 | 9/1950 | Coleman | 33/413 |
| 2,529,056 | 11/1950 | Sprowl | 33/408 |
| 2,647,321 | 8/1953 | Hart et al. | 33/409 |
| 2,788,584 | 4/1957 | Adrien . | |
| 3,122,836 | 3/1964 | Aciego | 33/413 |
| 3,171,210 | 3/1965 | Kundel . | |
| 3,222,787 | 12/1965 | Young . | |
| 3,295,209 | 1/1967 | Young . | |
| 4,106,203 | 8/1978 | Sikma et al. . | |
| 4,141,146 | 2/1979 | Broom . | |
| 4,228,588 | 10/1980 | Horton, Jr. | 33/413 |
| 4,754,553 | 7/1988 | Simpson | 33/1 H |

FOREIGN PATENT DOCUMENTS

| 83143 | 11/1919 | Switzerland | 33/755 |
| 389258 | 3/1965 | Switzerland | 33/1 LE |
| 609398 | 2/1979 | Switzerland | 33/756 |

Primary Examiner—Allan N. Shoap
Assistant Examiner—Christopher Fulton
Attorney, Agent, or Firm—Sheldon & Mak

[57] ABSTRACT

An apparatus for facilitating measurement of street grades from a top of curb (TC) planar datum line by a single person, including a pair of hook units, each having a rigid frame structure forming a top segment for resting on a top surface of a respective curb structure, a back segment for engaging a back surface of the curb structure, and a front segment extending from the top segment downwardly and away from the back segment for balancing the unit and for engaging various contoured front curb surfaces. One of the hook units includes a ratcheted spool for tensioning a string line that is connected to the other hook unit. The string line is threaded from the spool unit through an opening in the frame structure proximate an intersection of the top and back segments, the string line extending in contact with the top of the curb under the top segment, and through a slot in the front segment, the line extending directly toward the opposite curb. At the other hook unit, the line extends through a slot in its front segment, under its top segment in contact with the top of the curb, and through a slot located proximate an intersection of its back segment with the top segment, the string line having a ring tied thereto for removably engaging an outside surface of the frame structure.

19 Claims, 1 Drawing Sheet

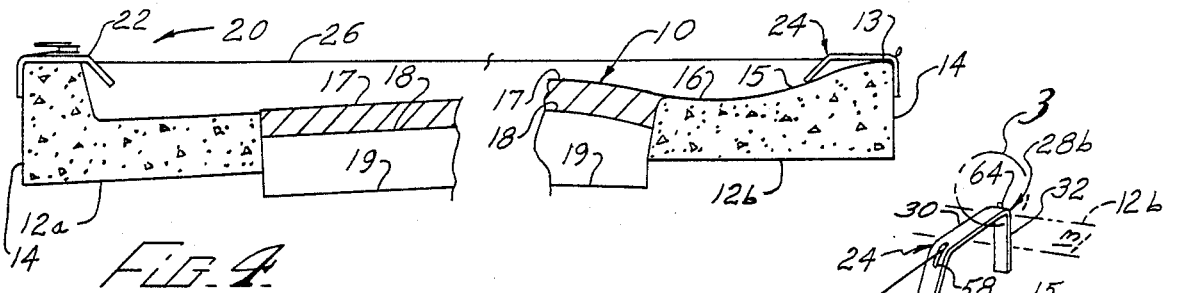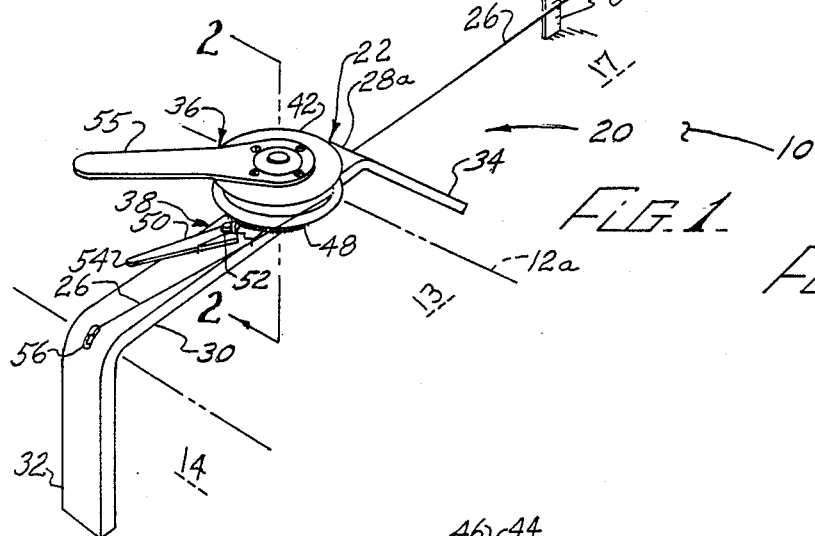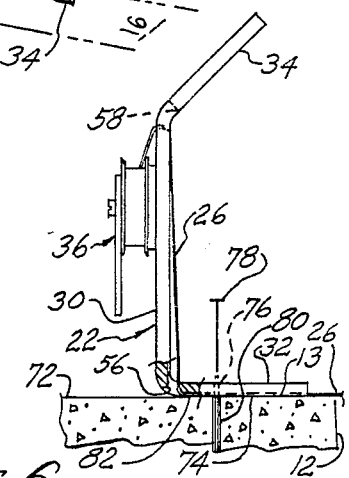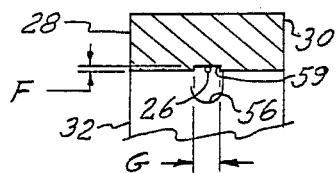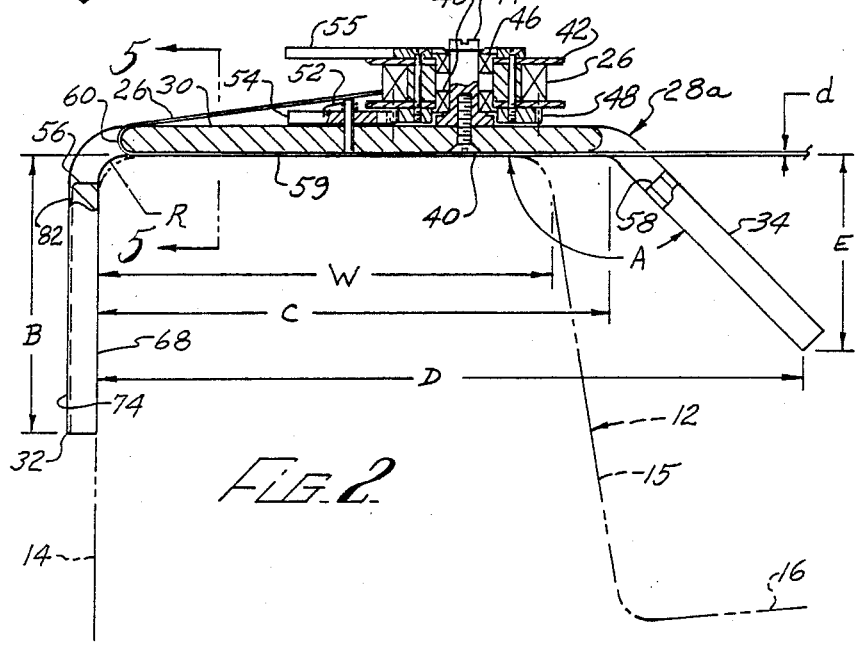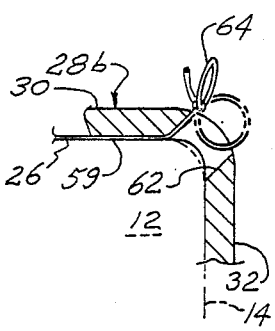

APPARATUS FOR FACILITATING ROADWAY GRADE MEASUREMENTS

BACKGROUND

The present invention relates to roadway grade measurements, and more particularly to apparatus for facilitating grade measurements between opposite roadway curb structures.

Roadway engineers generally reference all finish street grades to a datum that extends between opposite top of curb (TC) elevations. For contractors or inspectors to accurately determine the proper elevation and/or thickness of the required structural section or sections, a horizontal control is typically provided by holding a string line from one TC to the other on the opposite side of the street, from which a vertical depth or elevation can be measured by using a surveyor's rod or measuring tape. A disadvantage with this procedure is that two people are required for holding the opposite ends of the line, in addition to those that are required for measuring and recording the grade elevations. A device for referencing the grades of ditches is disclosed in U.S. Pat. No. 433,697 to Reichenbach, the device having a pair of stakes for driving into the ground, one of the stakes having an anchor for a string line, the other stake having a ratchet reel for storing and tensioning the line, the anchor and the ratchet reel being vertically adjustable on the respective stakes. This device is unsuitable for roadway grade measurements under many commonly encountered adverse conditions, such as rocky soil, a sidewalk located immediately adjacent to one or both curbs, buried utility lines, pipes and/or conduit, a datum that is located remote from the ground (such as where there are walls, barrier-type curbs, etc.), and existing trenches behind the curb and/or other obstacles that would reduce the work area.

It is also known to improvise a "curb hook" having a string attached. The hook would be engaged with one curb, with one man on the other curb to hold the string line taut against that curb. Thus it was possible to reduce the size of the crew by one.

However, even with the improvised curb hook, there remain significant problems; for example:

1. at least one crew member is required for locating and tensioning the string line, in addition to the one actually taking measurements;
2. existing curb hooks are ineffective in that they are not applicable to commonly encountered curb variations; and
3. existing curb hooks are unreliable in that they are subject to inadvertent disengagement because they are unstable, and because they are easily stretched out of shape under the moderate to high string line tension needed when measuring relatively wide roadways.

Thus there is a need for an apparatus for facilitating roadway grade measurements between opposing curbs that is reliable and effective with commonly encountered curb variations and roadway widths, that does not rely on the driving of stakes into the ground, and that is both easy and inexpensive to use.

SUMMARY

The present invention meets this need by providing an apparatus for facilitating measurement of street grades from a top of curb (TC) planar datum line by a single person. The apparatus includes a pair of hook units, each having a rigid frame structure that forms a top segment for resting on a top surface of a respective curb structure, and a back segment for engaging a back surface of the curb structure, one of the hook units also having spool means rigidly connected to its frame structure for storing and playing out a string line, and means for holding the string line to a predetermined extension, each hook unit further including means for positioning the string line in contact with the top surface of one curb structure and extending directly toward the top surface of the other curb structure. Thus the apparatus, once engaged with the opposite curb structures and adjusted with a desired extension and corresponding tension of the string line, can be left unattended while vertical measurements are made between the grade and the line at desired locations along the line. Accordingly, the apparatus allows accurate measurements for thickness and depth of subgrade, aggregate base, and asphalt.

The spool means can include a spool member rotatably mounted to the top segment of the associated frame structure, and a ratchet mechanism for selectively preventing rotation of the spool member. The apparatus can further include the string line connected to the spool member. Preferably the spool member is mounted above the top segment and spaced away from the back segment of the frame structure, and the means for positioning the string line can include a passage in the frame structure proximate an intersection of the top segment with the back segment for facilitating fabrication of the hook unit in a stable configuration having a low center of gravity, and with a direct path for the string line from the spool member to the passage in the frame structure. Preferably the means for positioning the string line further includes a groove formed in the underside of the top segment for receiving at least a portion of the string, thereby reducing or eliminating any tendency for the frame structure to rock from side to side on the string.

Preferably the frame structure of at least one frame unit also includes a front segment that extends downwardly from the top segment and away from the back segment, the front and back segments weighting the frame structure for locating the center of gravity of the hook unit below the bottom of the first segment for added stability of the hook unit on the curb structure, the frame structure further including means for laterally guiding the string line relative to the front segment for aligning the frame structure with the string line when tension is applied to the string line. Further, the hook unit is preferably adapted for front support from a gutter surface that is associated with a curb structure having a contoured profile, the top segment contacting the top surface of the curb structure proximate the back segment, the front segment contacting the gutter surface. Preferably the bottom of the top segment extends horizontally from not more than about 0.5 inch to not less than about 6 inches from a vertical line that intersects the point of engagement with the back surface for stabilized support of the hook unit on a curb structure having a flat top surface. Also, the free end of the front segment preferably extends horizontally between about 9 and about 11 inches from the vertical line and vertically to from about 2.5 inches to about 3.5 inches below the horizontal extension of the top segment for stabilized support of the hook unit on a curb structure having a shaped top surface in combination with a gutter surface. Thus the present invention is advantageously compatible with a variety of concrete and asphalt curb and curb/gutter combinations.

The frame structure is preferably formed from a elongate bar that includes the top, front, and back segments, the back segment intersecting the top segment at an angle of about 90 degrees, the front segment intersecting the top segment at an included angle of from about 90 degrees to about 150 degrees. More preferably, the angle between the front segment and the top segment is about 135 degrees.

The means for positioning the string line at the second hook unit can include a passage extending through the frame structure proximate an intersection of the top and rear segments, and the means for connecting the free end of the string line can include a surface of the frame structure that is supportive of an enlargement of the string line.

Preferably at least one of the hook units is adapted for use on a curb structure having another structure adjacent and flush with its top surface such that the back surface is inaccessible, the hook unit including means for connection to an expansion joint that is typically present between the adjacent structures, the means for positioning the string line including a passage in the frame structure proximate an intersection of the top and back segments. The means for connecting to the expansion joint can be another passage in the frame structure for receiving a fastener that engages the expansion joint. Preferably the means for positioning the string line further includes a groove that is formed in the back segment for receiving at least a portion of the string line passing between the back segment and the top surface of the curb.

DRAWINGS

These and other features, aspects, and advantages of the present invention will become better understood with reference to the following description, appended claims, and accompanying drawings where:

FIG. 1 is an oblique elevational perspective view of a roadway having opposing curb structures, and an apparatus according to the present invention for facilitating grade measurements of the roadway;

FIG. 2 is a fragmentary sectional side elevational view of the apparatus of FIG. 1 on line 2—2 of FIG. 1;

FIG. 3 is a fragmentary sectional side elevational detail view of the apparatus of FIG. 1 within region 3 of FIG. 1;

FIG. 4 is a side elevational view showing the apparatus of FIG. 1 in use with a roadway having different types of curb structures;

FIG. 5 is a fragmentary sectional elevational view of the apparatus of FIG. 1 on line 5—5 of FIG. 2; and FIG. 6 is an elevational view showing the the apparatus of FIG. 1 in use with a curb structure having an adjacent flush sidewalk.

DESCRIPTION

The present invention is directed to an apparatus for facilitating accurate measurements for thickness and depth of subgrade, aggregate base, and asphalt between opposite roadway curb structures. With reference to the drawings, a roadway 10 is bounded on opposite sides by a pair of curb structures 12, designated 12a and 12b in FIG. 1. The design of most curb structures is dictated by governmental agencies, which typically publish a series of approved patterns in a variety of configurations. In such configurations, the curb structures 12 generally form a top surface 13, a back surface 14, and a front surface 15, many such structures also incorporating a gutter portion 16. The patterns for curb structures generally fall into two categories, one having the back surface 14 generally vertical, the top surface 13 generally horizontal and not exceeding a width W of 6 inches, the front surface 15 being slightly inclined from vertical. When present, the gutter portion 16 joins a bottom extremity of the front surface 15, sloping slightly upwardly therefrom. In the design of the roadway 10, grade profiles are normally defined for a pavement surface 17, a base surface 18, and a subgrade surface 19, the grade definitions for the surfaces 17, 18, and 19 being defined relative to the top surface 13 of the respective curb structures 12a and 12b.

According to the present invention, a measurement apparatus 20 includes a first hook unit 22 and a second hook unit 24 for stretching a string line 26 between the top surfaces 13 of the curb structures 12a and 12b. Each of the hook units 22 and 24 is adapted for resting on the top surface 13 and engaging the back surface 14 of one curb structure 12. As best shown in FIGS. 1-3, each of the hook units 22 and 24 has a rigid frame structure 28, the frame structures being designated 28a and 28b in the drawings. Each frame structure 28 is formed from an elongate bar having rectangular cross section and including a top segment 30, a back segment 32, and a front segment 34. The back segment 32 intersects the top segment 30 at right angles for engaging the back surface 14 when the top segment 30 rests on the top surface 13 of the curb structure 12. The front segment 34 slopes downwardly and away from the back segment 32 at an included angle A relative to the top segment 30, the angle A being between approximately 90 degrees and approximately 150 degrees, the front segment 34 and the back segment 32 acting as counterweights for stabilizing the frame structure 28 with the top segment 30 thereof resting squarely on the top surface 13 of the curb structure 12.

The first hook unit 22 includes a spool assembly 36 and associated ratchet mechanism 38, the spool assembly 36 being fixed to the top of the top segment 30 by a fastener 40. The spool assembly 36 includes a flanged spool 42 on which the string line 26 is wound, the spool 42 being rotatably mounted on a vertically oriented stationary shaft 44 by a pair of bearing members 46, the shaft 44 being clamped to the top segment 30 by the fastener 40. The ratchet mechanism 38 includes a cog wheel 48 that is fastened to the spool 42, a pawl 50 that is pivotally mounted to the top segment 30, and a helical torsion spring 52 for biasing the pawl 50 into engagement with the cog wheel 48, thereby preventing rotation of the spool 42 in a direction that would unwind the string line 26 therefrom. An extension of the pawl 50 forms a handle 54 for disengaging the ratchet mechanism 38 when it is desired to play out the string line 26 from the spool 42. Also, a crank 55 is attached to the spool 42 for winding the string line 26 onto the spool 42.

From the spool assembly 36 the string line 26 is threaded through an opening 56 in the frame structure 28a, thence along the underside of the top segment 30, passing through a front slot 58 that is laterally centrally located in the frame structure 28 at the intersection of the front segment 34 with the top segment 30, the string line 26 contacting the top surface 13 of the curb structure 12a under the top segment 30, and extending directly toward the other curb structure 12b. A groove 59 is formed in the underside of the top segment 30 between the opening 56 and the front slot 58 for receiving at least a portion of the string line 26 that passes therebetween, so that the frame structure 28 can rest directly on the top surface 13 of the curb structure 12. For this purpose, the groove 59 is formed with a depth F that is the same, or nearly the same, as a diameter d of the string line 26. The groove also has a width G that is sufficiently wide to insure that the string line 26, under slight tension, remains within the width G of the groove 59 when the first hook unit 22 is being placed onto the curb structure 12. The opening 56 is formed to include a smoothly radiused course 60 that is laterally centrally located in the frame structure 28 proximate the intersection of the back segment 32 with the top segment 30, the course 60 smoothly blending with the groove 59.

The frame structure 28 of the second hook unit 24 generally corresponds to the frame structure 28a, including the top segment 30, the back segment 32, the front segment 34, and the front slot 58. The string line 26 is threaded through the front slot 58 of the frame structure 28b, thence through a rear slot 62 that is centrally located proximate the intersection of the back segment 32 with the top segment 30. A counterpart of the groove 59 also extends between the front slot 58 and the rear slot 62. As shown in FIG. 3, the string line 26 is tied to a small ring 64 which passes through the rear slot 62 when aligned therewith, the string line 26 being secured to the frame structure 28 when the ring 64 is turned out of alignment with the rear slot 62, the ring 64 forming an enlargement of the string line 26 that is supported on a surface of the frame structure 28b adjacent to the rear slot 62.

In operation, the second hook unit 24, with the string line 26 threaded and connected as described above, is placed on the curb structure 12b with the string line 26 resting on the top surface 13 thereof and the back segment 32 engaging the back surface 14. Then, with the handle 54 depressed for disengaging the ratchet mechanism 38, the first hook unit 22 is moved toward the curb structure 12a while the string line 26 is played off as required from the spool assembly 36, until reaching the curb structure 12a. Next, after engaging the frame structure 28a with the curb structure 12a similarly as the engagement of the frame structure 28b, the string line 26 is tightened by rotating the spool 42 by the crank 55. Thus tightened, the string line 26 provides a suitable reference for grade measurements to the pavement surface 17, the base surface 18, or the subgrade surface 19 of the roadway 10, depending on its stage in construction. For example, FIG. 1 shows a scale 66 positioned generally vertically, perpendicular to the string line 26 and resting on the pavement surface 17 for measuring a distance between the surface 17 and the string line 26.

As shown in FIG. 4, the roadway 10 can also include a curb structure 12b that has an alternative, contoured configuration. In the curb structure 12b of FIG. 4, the top surface 13 is convex, supporting the frame structure 28 proximate the back segment 32. The front surface 15 is concave, and extends to define a contour of the gutter portion 16. According to the present invention, the front segment 34 is located for supporting the frame structure 28 with the top segment 30 thereof approximately level, with the extremity of the front segment 34 contacting the front surface 15. It has been discovered that such support is obtained with the extremity of the front segment 34 extending horizontally a distance D of between about 9 and about 11 inches from the back segment 32, the front segment 34 also extending downwardly a distance E from about 2.5 inches to about 3.5 inches below the bottom of the top segment 30.

In a preferred configuration of the present invention, each frame structure 28 is formed from a high-strength aluminum alloy bar, approximately 0.375 inch by 1.0 inch in cross section. The back segment 32 extends below the top segment 30 a distance B of about 3.625 inches, and the intersection of the front segment 34 with the top segment 30 is at a distance C of about 6.75 inches from the rear segment 32. The distance D is about 9.312 inches, and the distance E is about 2.5 inches, the angle A being about 135 degrees. The spool assembly 36 is spaced substantially apart from the course 60 for permitting a direct path from the course 60 to the spool 42, thereby facilitating low cost production of the apparatus 10. The bar forming the frame structure 28 has an inside bend radius R of about 0.3 inch at the intersection of the top segment 30 with the back segment 32 for clearing a corresponding outside radius of the curb structure 12. Thus the underside of the top segment 30 extends horizontally from less than 0.5 inch to more than 6 inches from a vertical line 68 that intersects the point of engagement of the frame structure 28 with the back surface 14 of the curb structure 12. The groove 59 can have a width G of approximately 0.2 inch and, for a string line 26 having a diameter of 0.040 inch, a depth F of from about 0.035 to about 0.045 inch.

With further reference to FIG. 6, the apparatus 20 is adapted for use where the back surface 14 of the curb structure 12 is inaccessible. Typically, this situation occurs when another structure such as a sidewalk 72 is located adjacent to the curb structure 12, the top of the sidewalk 72 being substantially flush with the top surface 13 of the curb structure 12 as shown in FIG. 6. Accordingly, the apparatus 20 is positioned with an outside surface 74 of the back segment 32 resting on the top surface 13 of the curb structure 12, the back segment 32 also extending over the sidewalk 72. The stringline 26 is threaded in a reverse direction from the spool 42, through the front slot 58, and downwardly through the opening 56 for contacting the top surface 13. A passage 76 extends through the back segment 32 for receiving a nail or other fastener 78 that is temporarily driven into an expansion joint 80 between the curb structure 12 and the sidewalk 72, the expansion joint 80 being typically formed of a resilient material. Also, a groove 82 is formed along the outside surface 74 of the back segment 32 for receiving at least a portion of the string line 26 that passes between the back segment 32 and the curb structure 12, for enhancing the stability of the frame structure 28 in a fixed position on the curb structure 12, the groove 82 functioning in much the same way as the groove 59, described above. It is to be understood that the second hook unit 24 may be similarly configured as shown in FIG. 6 for the first hook unit 22, except that the string line 26 extends from the groove 82 and through the slot 62, directly to the ring member 64, the ring member 64 being retained against the opposite side of the frame structure 28b than is shown in FIG. 3.

Although the present invention has been described in considerable detail with reference to certain preferred versions thereof, other versions are possible. For example, the ring 64 can be configured as short pin memeber, the slot 62 being made smaller, yet sufficiently large for endwise passage of the pin member with the stringline tied thereto. Also, the slot 62, and/or the passage 56, can be oriented such that in the use depicted in FIG. 6, the string line extends from the associated hook unit in a direction opposite the back segment 32. Therefore, the spirit and scope of the appended claims should not necessarily be limited to the description of the preferred versions contained herein.

I claim:

1. An apparatus for facilitating grade measurements between opposite roadway curb structures, each curb structure having a top surface and a back surface facing away from the other curb structure, the apparatus comprising:
   (a) a first hook unit comprising:
      (i) a rigid first frame structure having a top segment for resting on the top surface of one of the curb structures, and a back segment for engaging the back surface;
      (ii) spool means rigidly connected to the first frame structure for storing and playing out a string line, including means for holding the string line to a predetermined extension; and
      (iii) means for positioning the string line in contact with the top surface of the curb structure and extending directly toward the top surface of the other curb structure; and
   (b) a second hook unit comprising:
      (i) a rigid second frame structure having a top segment for resting on the top surface of the other curb structure, and a back segment for engaging the back surface;
      (ii) means for connecting a free end of the string line to the second frame structure, comprising a supporting surface of the second frame structure for supporting an enlargement at the free end of the string line; and
      (iii) means for positioning the string line in contact with the top surface of the other curb structure and extending directly toward the top surface of the one curb structure, comprising a passage in the second frame structure for receiving the free end of the string line, including the enlargement, the passage being located proximate an intersection of the top segment with the back segment and adjacent to the supporting surface.

2. The apparatus of claim 1 wherein the spool means comprises:
   (a) a spool member rotatably mounted above the top segment and spaced toward the second hook unit from the back segment, and the means for positioning the string line comprises a passage in the frame structure proximate an intersection of the top segment with the back segment;
   (b) a ratchet mechanism for selectively preventing rotation of the spool member; and
   (c) the means for positioning the string line further comprising a passage in the frame structure proximate an intersection of the top segment with the back segment.

3. An apparatus for facilitating grade measurements between opposite roadway curb structures, each curb structure having a top surface and a back surface facing away from the other curb structure, the apparatus comprising:
   (a) a first hook unit comprising:
      (i) a rigid first frame structure having a top segment for resting on the top surface of one of the curb structures, a back segment for engaging the back surface;
      (ii) spool means rigidly connected to the first frame structure for storing and playing out a string line, including means for holding the string line to a predetermined extension; and
      (iii) means for positioning the string line in contact with the top surface of the curb structure and extending directly toward the top surface of the other curb structure; and
   (b) a second hook unit comprising:
      (i) a rigid second frame structure having a top segment for resting on the top surface of the other curb structure, and a back segment for engaging the back surface;
      (ii) means for connecting a free end of the string line to the second frame structure; and
      (iii) means for positioning the string line in contact with the top surface of the other curb structure and extending directly toward the top surface of the one curb structure, wherein at least one of the frame structures further comprises:
   (c) a front segment, the front segment extending from the top segment downwardly and away from the back segment, the back segment and the front segment weighting the frame structure for producing a center of gravity of the first hook unit that is located below the bottom of the first segment for stabilizing the hook unit on the curb structure; and
   (d) means for laterally guiding the string line relative to the front segment for aligning the frame structure with the string line when tension is applied to the string line.

4. The apparatus of claim 3 wherein the spool means comprises a spool member rotatably mounted to the top segment, and a ratchet mechanism for selectively preventing rotation of the spool member.

5. The apparatus of claim 4 further comprising the string line connected to the spool member.

6. The apparatus of claim 4 wherein the spool member is mounted above the top segment and spaced toward the second hook unit from the back segment when the frame member is oriented with the top segment resting on the top surface of the curb structure, the back segment engaging the back surface, and the means for positioning the string line comprises a passage in the frame structure proximate an intersection of the top segment with the back segment.

7. The apparatus of claim 6 wherein the means for positioning the string line further comprises a groove formed in the bottom of the top segment for receiving at least a portion of the string line passing thereunder.

8. The apparatus of claim 3 wherein the bottom of the top segment extends horizontally from not more than about 0.5 inch to not less than about 6 inches from a vertical line that intersects the point of engagement with the back surface for stabilized support of the hook unit on a curb structure having a flat top surface.

9. The apparatus of claim 8 wherein the free end of the front segment extends horizontally between about 9 and about 11 inches from the vertical line and vertically to from about 2.5 inches to about 3.5 inches below the horizontal extension of the top segment for stabilized support of the hook unit on a curb structure having a shaped top surface in combination with a gutter surface.

10. The apparatus of claim 3 wherein the frame structure further comprises an elongate bar, the bar forming the top, front, and back segments, the back segment intersecting the top segment at an angle of approximately 90 degrees, the front segment intersecting the top segment at an included angle of from about 90 degrees to about 150 degrees.

11. The apparatus of claim 10 wherein the angle between the front segment and the top segment is approximately 135 degrees.

12. An apparatus for facilitating grade measurements between opposite roadway curb structures, each curb structure having a top surface and a back surface facing away from the other curb structure, the apparatus comprising:
(a) a first hook unit comprising:
  (i) a rigid first frame structure having a top segment for resting on the top surface of one of the curb structures, and a back segment for engaging the back surface;
  (ii) spool means rigidly connected to the first frame structure for storing and playing out a string line, including means for holding the string line to a predetermined extension; and
  (iii) means for positioning the string line in contact with the top surface of the curb structure and extending directly toward the top surface of the other curb structure; and
(b) a second hook unit comprising:
  (i) a rigid second frame structure having a top segment for resting on the top surface of the other curb structure, and a back segment for engaging the back surface;
  (ii) means for connecting a free end of the string line to the second frame structure; and
  (iii) means for positioning the string line in contact with the top surface of the other curb structure and extending directly toward the top surface of the one curb structure,
wherein at least one of the hook units further comprises means for connecting the hook unit to an expansion joint between one of the curb structures and an adjacent structural component having a top surface flush with the top of the curb structure, the means for positioning the string line comprising a first passage in the frame structure of the hook unit, the first passage being located proximate an intersection of the top segment and the back segment.

13. The apparatus of claim 12 wherein the means for connecting the hook unit comprises a second passage in the frame structure of the hook unit, the second passage extending through the back segment for receiving a fastener for engaging the expansion joint.

14. The apparatus of claim 13 wherein the means for positioning the string line further comprises a groove formed in the back segment for receiving at least a portion of the string line, the string line passing between the back segment and the top of the curb structure.

15. The apparatus of claim 12 wherein the spool means comprises a spool member rotatably mounted to the top segment, and a ratchet mechanism for selectively preventing rotation of the spool member.

16. The apparatus of claim 15 further comprising the string line connected to the spool member.

17. The apparatus of claim 15 wherein the spool member is mounted above the top segment and spaced toward the second hook unit from the back segment, and the means for positioning the string line comprises a passage in the frame structure proximate an intersection of the top segment with the back segment.

18. The apparatus of claim 17 wherein the means for positioning the string line further comprises a groove formed in the bottom of the top segment for receiving at least a portion of the string line passing thereunder.

19. An apparatus for facilitating grade measurements between opposite roadway curb structures, each curb structure having a top surface and a back surface facing away from the other curb structure, the apparatus comprising:
(a) first and second hook units, each hook unit comprising:
  (i) a rigid frame structure comprising an elongate bar, the bar forming a top segment for resting on the top surface of one of the curb structures, a back segment for engaging the back surface, and a front segment, the back segment intersecting the top segment at an angle of approximately 90 degrees, the bottom of the top segment extending horizontally from not more than about 0.5 inch to not less than about 6 inches from a vertical line that intersects the point of engagement with the back surface, the front segment extending from the top segment downwardly and away from the back segment at an included angle relative to the horizontal extension of from about 90 degrees to about 150 degrees, the free end of the front segment extending horizontally between about 9 and about 11 inches from the vertical line and vertically to from about 2.5 inches to about 3.5 inches below the horizontal extension of the top segment, the back segment and the front segment weighting the frame structure for producing a center of gravity of the hook unit that is located below the bottom of the first segment for stabilizing the hook unit on the curb structure;
(b) the first hook unit further comprising:
  (i) spool means rigidly connected to the frame structure for storing and playing out a string line, comprising a spool member located above the top segment and rotatably mounted thereto, and a ratchet mechanism for holding the string line to a predetermined extension by selectively preventing rotation of the spool;
  (ii) means for positioning the string line in contact with the top surface of the curb structure and extending directly toward the top surface of the other curb structure, comprising a passage in the frame structure proximate an intersection of the top segment with the back segment; and
  (iii) means for laterally guiding the string line relative to the front segment for aligning the frame structure with the string line when tension is applied to the string line; and
(c) the second hook unit further comprising:
  (i) means for connecting a free end of the string line to the frame structure;
  (ii) means for positioning the string line in contact with the top surface of the other curb structure and extending directly toward the top surface of the one curb structure; and
  (iii) means for laterally guiding the string line relative to the front segment for aligning the frame structure with the string line when tension is applied to the string line.

* * * * *